July 25, 1961 J. C. STRITE 2,993,519
KERFING MACHINE
Filed July 19, 1960 2 Sheets-Sheet 1

INVENTOR.
JOSEPH C. STRITE
BY
Kimmel & Crowell
ATTORNEYS

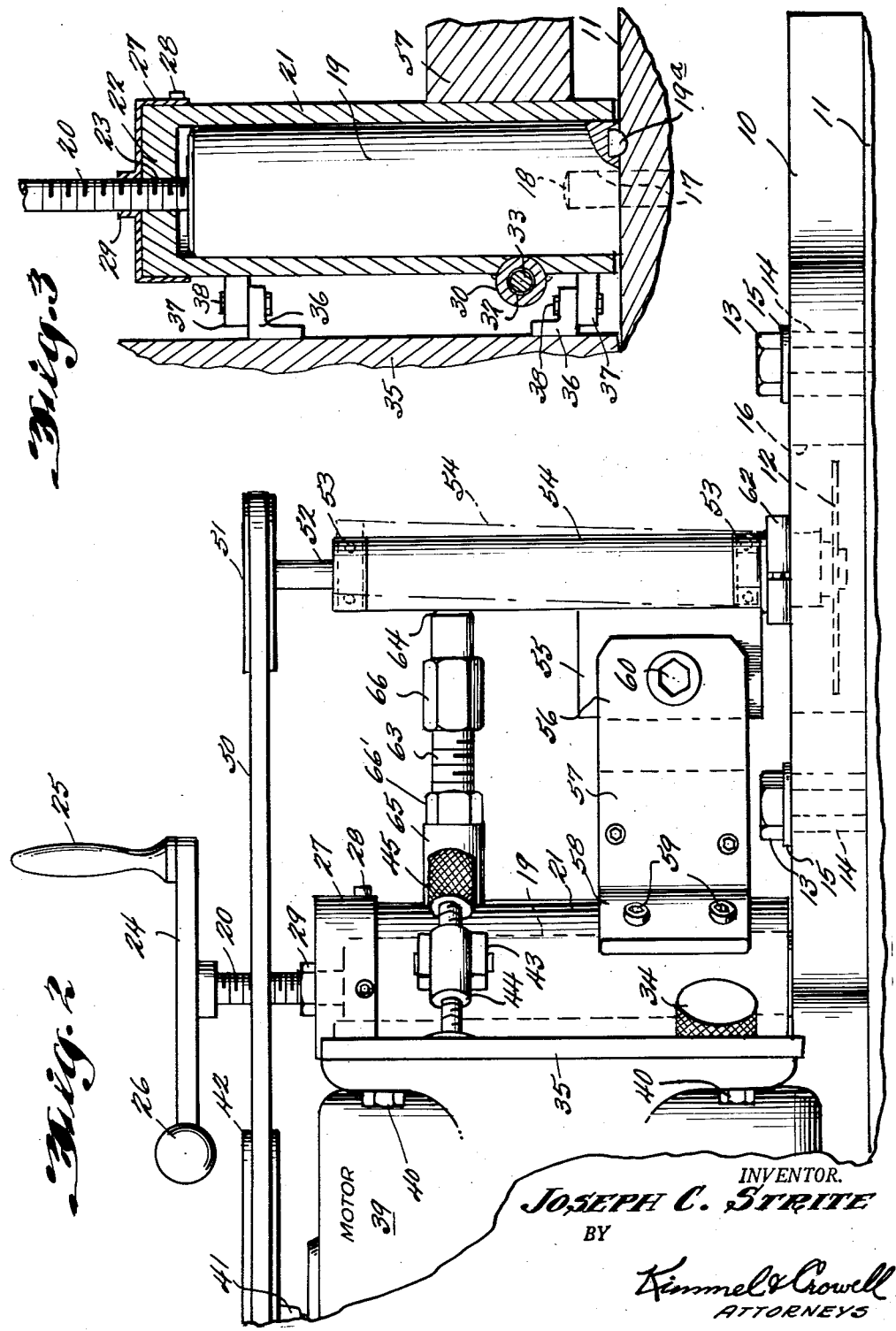

United States Patent Office 2,993,519
Patented July 25, 1961

2,993,519
KERFING MACHINE
Joseph C. Strite, 4333 Shasta Way, Klamath Falls, Oreg.
Filed July 19, 1960, Ser. No. 43,933
7 Claims. (Cl. 144—136)

This invention relates to a kerfing machine, and has particular applicability to a machine designed for placing kerfs in molding patterns of various shapes or the like.

The primary object of the invention is the provision of an improved kerfing machine of small size and relatively simple construction which may be secured to a molding machine of conventional design for the purpose of placing any desired kerf in a molding pattern and readily removed when not needed.

An additional object of the invention is the provision of such a device which is so arranged on the molding machine that it takes the place of the outside guide on the receiving plate of the molder, which latter may be readily replaced when the kerfing machine is removed.

A specific object of the invention is the provision of a kerfing machine which is particularly adapted for cutting kerfs or weatherstrip grooves in sash patterns.

Still another object of the invention is the provision of such a kerfing machine wherein the saw can be quickly and easily adjusted for either height or depth as needed, and wherein the saw can also be perfectly lined up in the cut so as not to create any burn on the wood.

Additional object of the invention is the provision of a device of this character which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter, and disclosed in the accompanying drawings wherein there is shown a preferred embodiment of this inventive concept.

In the drawings:

FIGURE 2 is a side elevational view of the structure of FIG. 1.

FIGURE 3 is a fragmentary vertical sectional view taken substantially along the line 3—3 of FIG. 1 as viewed in the direction indicated by the arrows.

Similar reference characters refer to similar parts throughout the several views of the drawing.

Figure 1:
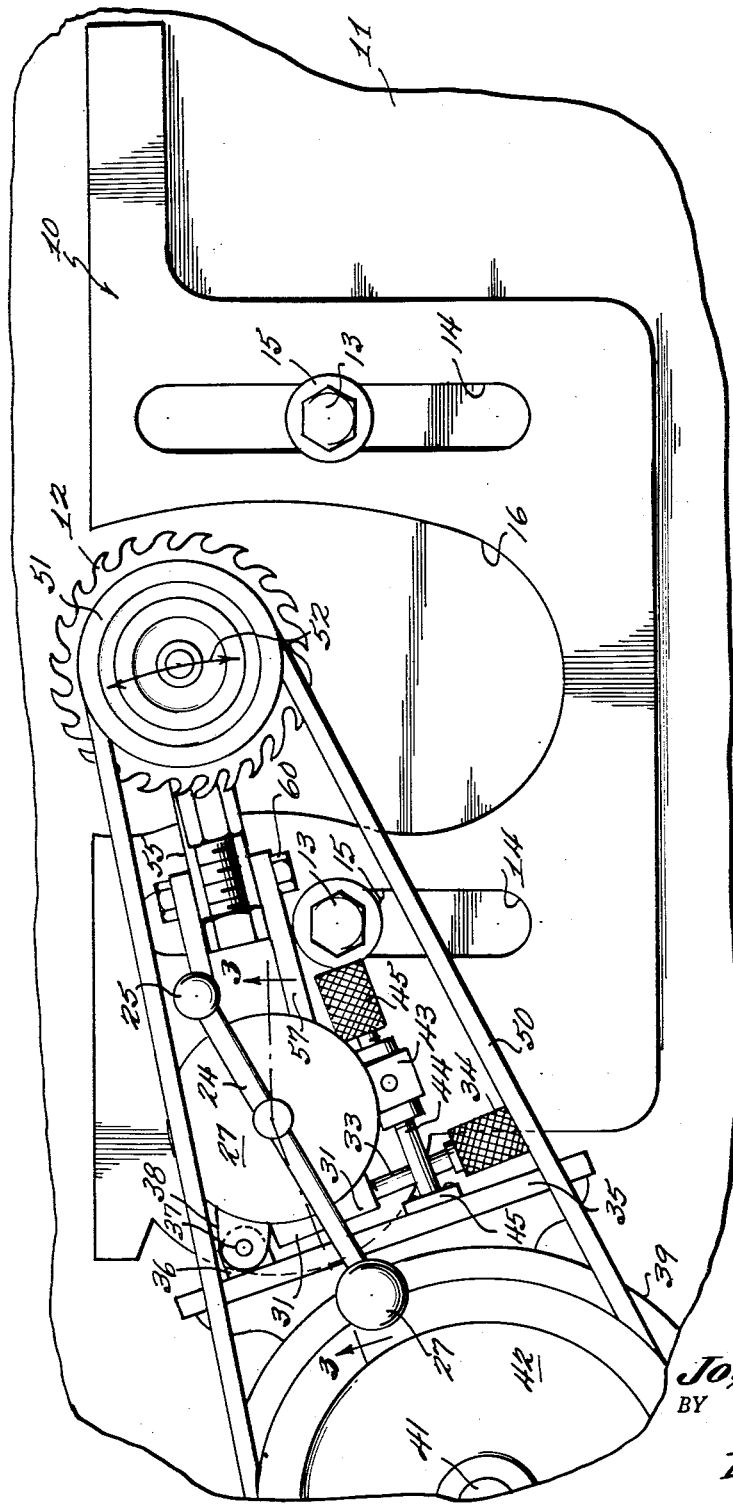
FIGURE 1 is a top plan view of one form of kerfing machine constructed in accordance with the instant invention shown as mounted on a molding machine, or in any other desired locality.

Having reference now to the drawing in detail, the device of the instant invention comprises a base plate, generally indicated at 10 which is adapted to be mounted on any suitable supporting surface 11, such as a conventional molding machine, in which case it may take the place of the outside guide thereof, with the saw blade 12 projecting into the path of movement of the molding to be kerfed.

Plate 10 is adapted to be secured to the machine 11 as by means of bolts 13, which pass through elongated slots 14 in the plate, washers 15 being provided to secure the bolts effectively in the slot. The slots are provided to permit linear adjustment of the plate and its associated mechanism, to be described more fully hereinafter, in proper alignment with the molding. Plate 10 has a relatively large central slotted opening 16, in which the saw 12 is adapted to be positioned, the slot 16 being slightly arcuate in configuration, to permit the saw to be swung in an arc, in a manner to be more fully described hereinafter.

Plate 10 carries an upstanding stud 17, which is adapted to seat in a recess 18 in the base of a cylindrical post 19, to the upper end of which is secured a threaded shaft 20. A key 19a engages in suitable aligned slots in the bottom of post 19 and plate 10 to prevent turning of the post.

The post 19 is surrounded by a relatively heavy tube or sleeve 21, having a top wall 22 with a threaded bore 23 therein, in which is engaged the shaft 20, so that rotation of shaft 20 will raise or lower the sleeve 21 on the post 19, for a purpose to be more fully described hereinafter. Such rotation may be effected by means of a handle bar 24 secured to the upper end of shaft 20, bar 24 being provided with an upstanding handle 25 and a counter balance weight 26. Sleeve 21 is provided with a top cap 27 which is secured thereto as by means of screws or bolts 28, and which is surmounted by a nut 29, through which the shaft 20 also extends.

The sleeve 21 is normally freely rotatable on the post 19, but is provided at its lower end with a sleeve 30, welded thereto, having a threaded bore 32. A bias bar 33 having a knurled operating knob 34 extends into the bore 32 and serves, when rotated to clamp the sleeve 21 tightly to the post 19, so that in case the saw fails to start, the sleeve 21 will allow the saw to swing out of the kerf without damage.

A motor mounting plate 35 carries a pair of spaced lugs 36 whcih are aligned with corresponding lugs 37 carried by sleeve 21, and pivotally secured thereto as by means of bolts 38 to permit limited pivotal movement of the mounting plate relative to the sleeve. A motor 39 is fixedly secured to the plate 35 as by means of bolts 40, the motor being vertically positioned, and having a drive shaft 41 extending through the top thereof, upon which is mounted a drive pulley 42.

Means for adjusting the relative position of motor mounting plate 35 about the pivots 37 is also provided, and takes the form of a laterally projecting lug 43 mounted on sleeve 21, and having a threaded bore extending transversely therethrough, in which is mounted a threaded shaft 44 having a knurled operating knob 45 at one end thereof. The end of the shaft is rounded and engages in a cup-shaped detent 45, so that rotation of the operating knob in one direction biases the plate 45 away from the sleeve 21.

This movement affords sufficient play for tensioning a belt 50 which extends about pulley 42, and which at its other end extends about a drive pulley 51, which is mounted on a shaft 52. The shaft 52 extends through suitable bearings 53 in a tubular sleeve 54, which has a relatively large lug 55 projecting from the side thereof adjacent the sleeve 21. The lug 55 seats between the bifurcations 56 of a bifurcated plate 57, which is provided at its end with arcuate flange portions 58 which are secured in turn by bolts 59 to the sleeve 21. A pivot 60 connects the lug 55 with the bifurcations 56 in pivotal relation for limited vertical tilting movement. The end of shaft 52 extends through a collar 62 below the sleeve 54 and has mounted thereon, in any desired conventional manner, the circular saw 12.

Adjustment of the titlting movement of sleeve 54 is effected by means of a threaded bolt 63, having a rounded end 64 engaging in abutting relation with the side of the sleeve 54. The bolt 63 engages in a threaded boss 65 carried by sleeve 21, in substantial alignment with plate 57, and, rotation of the bolt 63 by means of an operating head 66 will serve to tilt the sleeve 54 to align the saw blade 12. A lock nut 66' is also provided to retain the angularity of the saw blade when adjustment is initially effected.

From the foregoing the use and operation of the device should now be readily understandable. The plate 10 and its associated elements are first mounted on the base 11, taking the place for example, of the outer guide of a molding machine, and the saw blade 12 is suitably adjusted for the depth of cut. This adjustment is effected by release of the locking knob 34, so that the sleeve 21 may be rotated about the post 19, thus positioning the saw 12 in the slot 16, with an edge thereof extending outwardly to a distance sufficient to impart the desired depth of kerf. Simultaneously, rotation of shaft 20 by operating handle 25 will vary the relative height of the sleeve 21 on the post 19, and due to the connection between the sleeve 21 and the post 54, will also effectively vary the height of the saw blade 12 in the slot 16, or the position of the kerf relative to the molding. After suitable adjustment has been made, tightening of the locking handle 34 will serve to clamp the parts in adjusted position. Rotation of the operating knob 45 will serve to tilt the plate 35 and its associated motor about the pivots 37, and will serve to tension the belt 50 effectively for most efficient driving of the saw 12. The saw blade 12 may also be centered exactly in the cut by means of tilting the sleeve 54 about its pivot 60, the adjusted position being maintained by rotation of the threaded member 63. When the parts are properly set an unlimited number of kerfs may be cut in moldings, which are simply fed by the blade 12 in conventional manner.

From the foregoing it will now be seen that there is herein provided an improved kerfing machine, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a kerfing machine, the combination of a base plate, a vertical post carried by said base plate, a first sleeve rotatably adjustable on said post, a motor plate pivotally mounted on said first sleeve, a motor mounted on said motor plate with its axis vertically disposed, a second sleeve mounted on said base plate in spaced, parallel relation to said first sleeve and adjustably secured to said first sleeve, a drive shaft extending vertically through said second sleeve, a belt and pulley connection between said motor and the upper end of said drive shaft, and a kerfing saw on the lower end of said drive shaft.

2. In a kerfing machine, the combination of a base plate, a vertical post carried by said base plate, a first sleeve rotatably adjustable on said post, a motor plate pivotally mounted on said first sleeve, a motor mounted on said motor plate with its axis vertically disposed, a second sleeve mounted on said base plate in spaced, parallel relation to said first sleeve and adjustably secured to said first sleeve, a drive shaft extending vertically through said second sleeve, a belt and pulley connection between said motor and the upper end of said drive shaft, and a kerfing saw on the lower end of said drive shaft, said base plate having an arcuate slot therein, and said kerfing saw extending into said slot, said slot opening on one side of said base plate, with a portion of the edge of said kerfing saw extending through said opening, rotatable adjustment of said first sleeve varying the extent of said last-mentioned portion.

3. In a kerfing machine, the combination of a base plate, a vertical post carried by said base plate, a first sleeve rotatably adjustable on said post, a motor plate pivotally mounted on said first sleeve, a motor mounted on said motor plate with its axis vertically disposed, a second sleeve mounted on said base plate in spaced, parallel relation to said first sleeve and adjustably secured to said first sleeve, a drive shaft extending vertically through said second sleeve, a belt and pulley connection between said motor and the upper end of said drive shaft, and a kerfing saw on the lower end of said drive shaft, said base plate having an arcuate slot therein, said kerfing saw extending into said slot, said slot opening on one side of said base plate, with a portion of the edge of said kerfing saw extending through said opening, rotatable adjustment of said first sleeve varying the extent of said last-mentioned portion, and means for clamping said first sleeve to said post.

4. In a kerfing machine, the combination of a base plate, a vertical post carried by said base plate, a first sleeve rotatably adjustable on said post, a motor plate pivotally mounted on said first sleeve, a motor mounted on said motor plate with its axis vertically disposed, a second sleeve mounted on said base plate in spaced, parallel relation to said first sleeve and adjustably secured to said first sleeve, a drive shaft extending vertically through said second sleeve, a belt and pulley connection between said motor and the upper end of said drive shaft, and a kerfing saw on the lower end of said drive shaft, said base plate having an arcuate slot therein, said kerfing saw extending into said slot, said slot opening on one side of said base plate, with a portion of the edge of said kerfing saw extending through said opening, rotatable adjustment of said first sleeve varying the extent of said last-mentioned portion, means for clamping said first sleeve to said post, and means for varying the position of said motor plate relative to said first sleeve, about its pivotal mounting, to tension said belt.

5. The structure of claim 1 wherein means are provided for vertical adjustment of the position of said first sleeve on said post.

6. The structure of claim 5 wherein said last-mentioned means comprises a cap on said first sleeve, a threaded nut on said cap, a screw extending through said threaded nut and engaging said post, and an operating handle for rotating said screw.

7. The structure of claim 1 wherein the means securing said second sleeve to said first sleeve includes a horizontal pivot whereby said second sleeve may be tilted on an horizontal axis to vary the plane of operation of said kerfing saw.

References Cited in the file of this patent
UNITED STATES PATENTS

| | | |
|---|---|---|
| 366,633 | Mackintosh | July 12, 1887 |
| 881,064 | Favreau | Mar. 3, 1908 |
| 2,193,864 | Fidler et al. | Mar. 19, 1940 |
| 2,535,908 | Epplin | Dec. 26, 1950 |
| 2,661,777 | Hitchcock | Dec. 8, 1953 |
| 2,753,900 | Bjork | July 10, 1956 |
| 2,792,032 | Olsen | May 14, 1957 |
| 2,851,068 | Goodlet | Sept. 9, 1958 |